UNITED STATES PATENT OFFICE.

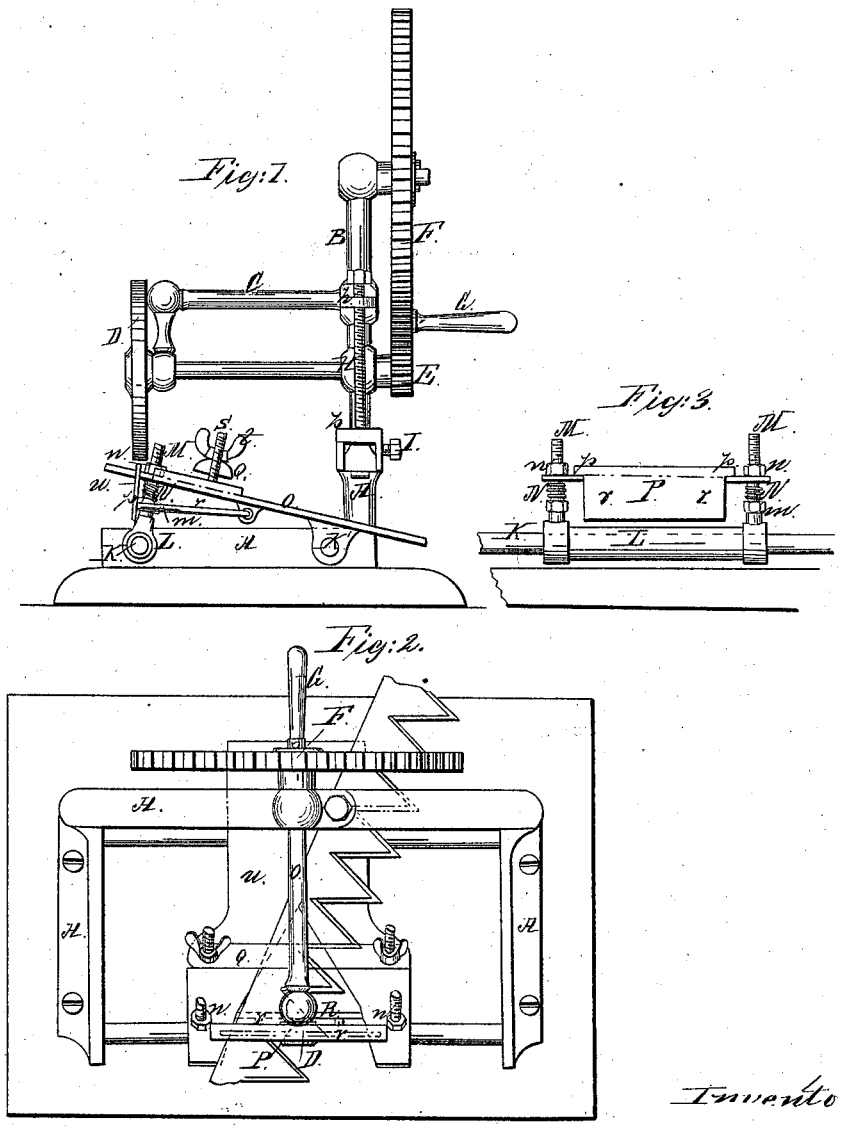

FREDERICK JUDSON, OF CASTLETON, NEW YORK.

IMPROVEMENT IN MACHINES FOR GRINDING REAPER-KNIVES.

Specification forming part of Letters Patent No. 81,646, dated September 1, 1868.

*To all whom it may concern:*

Be it known that I, FREDERICK JUDSON, of Castleton, in the county of Rensselaer and State of New York, have invented certain new and useful Improvements in Reaper-Knife-Grinding Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1 is a side elevation, and Fig. 2 is a plan, of the machine. Fig. 3 is a front elevation of the carriage U.

The nature of my invention consists in an adjustable sliding carriage so arranged and combined with other parts of the machine that when the sickle-bar with its knives is secured onto the said carriage in certain position, and brought under the grindstone of the machine, the blade of the knife will be effectively and properly ground.

A is a frame. B is a standard, setting in the socket b, in which it can slide up or down, and provided with an arm, C, supporting the grindstone D. The stone is worked by pinion E gearing into cog-wheel F, operated by handle G. H is an upright screw, resting on frame A, and operating a nut, h, secured to the standard, and the said screw, by being worked, raises or lowers the standard B, thus taking the grindstone off or bringing it down to the knife. U is a sliding carriage, moving along guide-rods K K', over one of which, K, is put a sleeve, L, provided with standards M M made in the shape of bolts at the upper end, and provided with flanges m m, on which rest coil-springs N N. A notched plate, O, is hinged to rod K' on one side, and is resting on springs N N on the other side, the bolts M M passing through the plate. By means of nuts n n this side of the plate may be raised or lowered, and brought into a desirable position.

Plate P is placed in a vertical position in the recess or notch R of plate O, and is attached to the bottom of the plate, so as to be raised or lowered when used, the attachment being made by means of rods r r, arranged in the shape of hinges, or in some other convenient manner; but the said plate P, when not in use, rests on the plate O by means of its projections p p. This plate P is operated by hand, and when raised and supported serves as a stop, to which the blade of the knife to be ground abuts, as represented on Fig. 2, and when such a knife to be ground is placed in such a position the sickle-bar is secured to the plate O by means of bar Q and bolts S S, provided with nuts t t.

The operation of the machine consists in this, that after having the plate O properly adjusted the sickle-bar is placed diagonally on it, in such a manner as to bring the blade of one knife close to the raised stop P, and is secured in that position by the bar Q. Then the stop is dropped down from the knife, and the carriage U is pushed under the grindstone, which is brought down to the knife by the screw H, and steadied in position by the screw I, and the grinding operation is performed. The carriage is moved now from under the stone, the sickle-bar is shifted so as to bring the blade of the next knife to the stop P; and the same operation as described above is repeated.

When one side or blade of the knives is ground the sickle-bar is reversed in its position, and the opposite side or blade of the knives is ground in a similar manner.

When the machine is not grinding the reaper-knives the grindstone may be used for ordinary purposes by loosening screw I and turning standard B half around.

What I claim as my invention, and desire to secure by Letters Patent, is—

1. The sliding carriage U, so arranged as to have the side brought to the grindstone adjustable vertically, substantially as herein set forth and specified.

2. The stop P, arranged and connected with plate O, substantially as above described, and for the purpose specified.

3. In combination with the above, the bar Q, guide-rods K K', standard B, arm C, screw H, and set-screw I, the whole arranged and operating substantially as set forth.

4. A yielding support for the knives, so constructed as to compensate for irregularities in the surface of the knives when passing under the stone, substantially as described.

FREDERICK JUDSON.

Witnesses:
J. B. TURCHIN,
H. CONSBRUCH.